United States Patent [19]

Kuwano et al.

[11] Patent Number: 4,922,111

[45] Date of Patent: May 1, 1990

[54] CARD TYPE IMAGE READER WITH MEANS FOR RELIEVING BENDING STRESS

[75] Inventors: Yukinori Kuwano; Noriyuki Mori; Shoichi Nakano; Hisao Uehara; Mitsugu Kobayashi, all of Osaka; Kaneo Watanabe, Kyoto; Shigeru Noguchi, Osaka, all of Japan

[73] Assignee: Sanyo Electric Co., Ltd., Osaka, Japan

[21] Appl. No.: 268,086

[22] Filed: Nov. 7, 1988

[30] Foreign Application Priority Data

Nov. 20, 1987 [JP] Japan ................... 62-294941

[51] Int. Cl.⁵ .................... G06K 7/10; G06K 9/22
[52] U.S. Cl. .................... 250/566; 250/221; 250/578.1; 250/239; 235/472; 382/59
[58] Field of Search ............... 235/472; 250/221, 566, 250/578, 239, 569; 340/710; 382/59, 65, 67

[56] References Cited

U.S. PATENT DOCUMENTS

| | | | |
|---|---|---|---|
| 3,868,514 | 2/1975 | Israelsson | 250/566 |
| 4,074,114 | 2/1978 | Dubras | 250/566 |
| 4,471,218 | 9/1984 | Culp | 235/472 |
| 4,701,804 | 10/1987 | Toyoda et al. | 382/59 |
| 4,721,849 | 1/1988 | Davis et al. | 235/472 |
| 4,731,668 | 3/1988 | Satomura et al. | 382/59 |
| 4,743,773 | 5/1988 | Katana et al. | 250/566 |
| 4,806,743 | 2/1989 | Thenery | 235/472 |

Primary Examiner—David C. Nelms
Assistant Examiner—Michael Messinger
Attorney, Agent, or Firm—Darby & Darby

[57] ABSTRACT

A card type image reader comprises a rectangular card base and a reinforcing member provided on one side of the card base. A photodetector array in a straight line is provided on one end portion of the reinforcing member and the card base holds control circuit means and memory means. The control circuit means reads information of an original through the photodetector array in synchronization with a clock signal and stores the read information into the memory means.

9 Claims, 3 Drawing Sheets

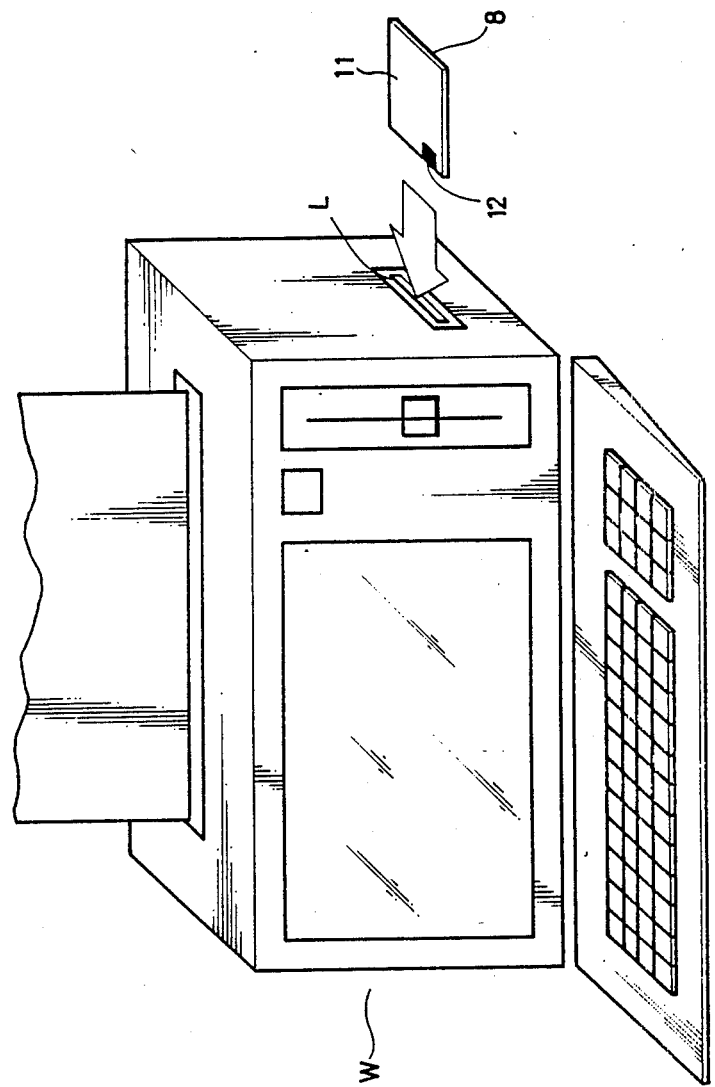

CARD TYPE IMAGE READER WITH MEANS FOR RELIEVING BENDING STRESS

BACKGROUND OF THE INVENTION

1. Field of the Invention

The present invention relates to image readers for reading information of an original document, figures, symbolic codes or the like and outputting data of the read information or processed data, and particularly to card type image readers.

2. Description of the Prior Art

Referring to FIG. 6, there is schematically illustrated a sectional view of a handy image reader for a word-processor or a personal computer. This image reader includes a reading window 2 at a lower end of a case 1. There are further provided, at the lower end of the case 1, a roller 3 partially protruding from the lower surface of the case 1, and a linear LED (Light Emitting Diode) array 4 arranged in a direction perpendicular to the surface of the drawing. In addition, there are provided, above the reading window 2, a focusing lens system 5 and a photodetector array 6 arranged in a straight line perpendicular to the surface of the drawing. The image reader of FIG. 6 is moved on an original and, during this movement, the original illuminated by the LED array 4 through the window 2 is read by the photodetector array 6 through the lens system 5.

However, the image reader of FIG. 6, when it is in operation, needs to be always connected to a word-processor or the like by means of a cable and can not be used separately therefrom in an independent manner.

Japanese Patent Laying-Open Gazette No.164368/1986 discloses that a memory device for storing read information is provided in an image reader so as to enable such an image reader as shown in FIG. 6 to be used in an independent manner separately from a wordprocessor or the like. However, such a portable image reader is desired to be more compact so that it can be transported more easily.

Recently, various electronic devices have been designed in forms of cards, so that they can be transported easily. Usually, cards of flexible material such as plastic are used as bases for such card type electronic devices. Generally, such a card has a compact size as of a driver's license or a commuter ticket which is easily transportable. It may happen that external force such as bending is applied to such a card type electronic device when it is transported or in operation.

Generally, when an electronic device including semiconductor devices is fabricated in the form of a card, the semiconductor devices are arranged in a peripheral portion of a card base, not in its central portion where a bending stress is liable to be concentrated, as shown in Japanese Patent Publication No. 29260/1978. However, a card type electronic device is sometimes subjected to bending stress even in the peripheral portion of the card and thus the semiconductor devices can not be sufficiently protected.

SUMMARY OF THE INVENTION

In view of the above described prior art, an object of the present invention is to provide a card type image reader which is easily transportable.

Another object of the present invention is to provide a card type image reader provided with a reinforced portion against bending.

A further object of the present invention is to provide a card type image reader provided with a display which enables confirmation of information which is being read.

According to the present invention, a card type image reader to be moved on a surface of an original comprises: a substantially rectangular card base, a reinforcing member provided on one side of the card base, a linear photodetector array provided on one end surface of the reinforcing member, and a control circuit held in the card base. The control circuit comprises clock means for generating a clock signal and reads information of the original through the photodetector array in synchronization with the clock signal. The image reader further comprises a memory held in the card base, which stores information read through the photodetector array by the control circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a perspective view schematically showing a wordprocessor for displaying or printing out information read by a card type image reader according to the present invention.

DESCRIPTION OF THE PREFERRED EMBODIMENTS

Figure 1:
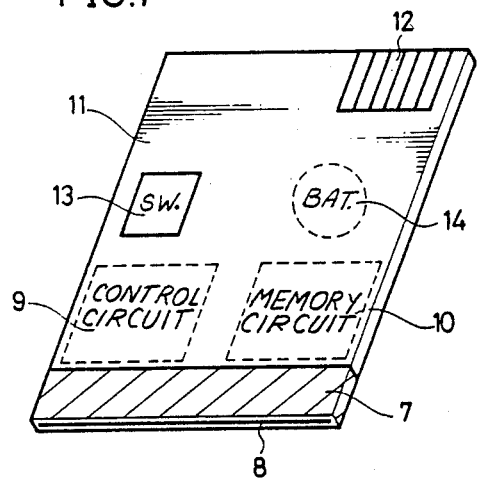
FIG. 1 is a perspective view schematically showing a card type image reader according to an embodiment of the present invention.

Referring to FIG. 1, there is schematically shown a card type image reader according to an embodiment of the invention. This image reader comprises a substantially rectangular card base 11 formed of epoxy resin for example. A reinforcing member 7 of metal, ceramics or carbon fiber reinforced plastic or the like is provided on one side of the case base 11. A photodetector array 8 in a straight line is provided on an end surface of the reinforcing member 7. The card base 11 holds a control circuit portion 9 and a memory circuit portion 10. Those circuit portions 9 and 10 are formed by semiconductor integrated circuits. The card base 11 further holds a power supply battery 14, an operation switch 13, and input/output terminals 12.

After the operation switch 13 is turned on, the card type image reader of FIG. 1 is moved in the thickness direction of the card base 11 on an original while the photodetector array 8 faces the original. The control circuit portion 9 reads information from the original through the photodetector array 8 and stores the read information into the memory circuit portion 10 as it is or after having processed it. The control circuit portion 9 includes a clock circuit for generating a clock signal and reads information by repeating scanning from one end to the other end of the linear photodetector array 8 in synchronization with the clock signal. The information stored in the memory circuit portion 10 is read out by a card reader L of a wordprocessor W, as shown in FIG. 5 for example, through the input/output terminals 12, so that it is displayed on a cathode ray tube display or printed out on a paper sheet.

The card type image reader as shown in FIG. 1 has the below described advantages (1) to (3).

(1) The card type image reader has a light weight and is compact and therefore it can be transported very easily.

(2) Since the card type image reader comprises the memory for storing read information, it is not limited by time or place for reading originals.

(3) Since the card type image reader is thin, it is easy to confirm a portion which is being read, by visually verifying both sides of the card.

Figure 2:
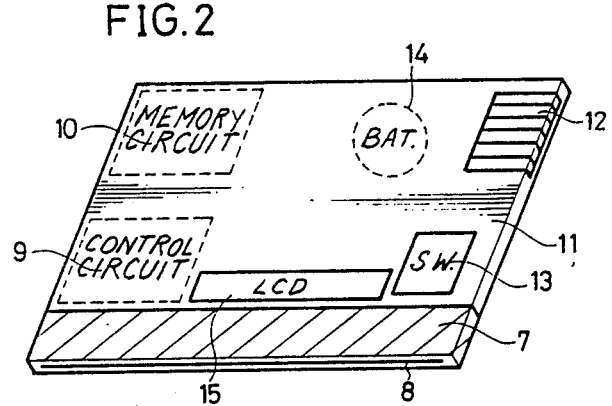
FIG. 2 is a perspective view of a card type image reader according to another embodiment of the invention.

Referring to FIG. 2, another embodiment of the invention is illustrated. The card type image reader of FIG. 2 is similar to that of FIG. 1, except that a reinforcing member 7 is provided on a longer side of the rectangular card base 11. In the card type image reader of FIG. 2, the card base 11 further holds a liquid crystal display 15 along the reinforcing member 7. This display 15 displays information of an original in a reduced scale. Thus, it is possible to move the card type image reader while confirming information which is being read. The liquid crystal display 15 may be replaced by an LED display, an electroluminescence display, a plasma display or the like.

Figure 3:
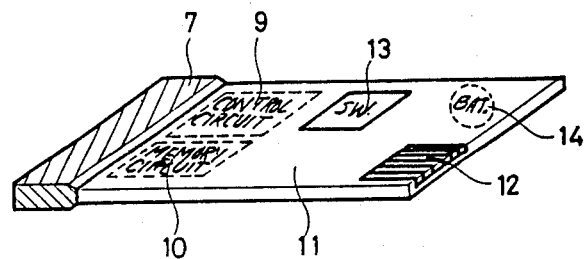
FIG. 3 is a perspective view of a card type image reader according to a further embodiment of the invention.

Referring to FIG. 3, a further embodiment of the invention is illustrated. The card type image reader of FIG. 3 is similar to that of FIG. 1, but it has a reinforcing member 7 thicker than the card base 11. A slot is formed on one end surface of the thick reinforcing member 7 and the card base 11 is inserted in this slot, whereby the reinforcing member 7 and the card base 11 can be coupled in a solid manner. Alternatively, a photodetector array may be formed on one end surface of the card base 11 and this card base may be inserted in a deep slot of a transparent reinforcing member 7.

Figure 4A:
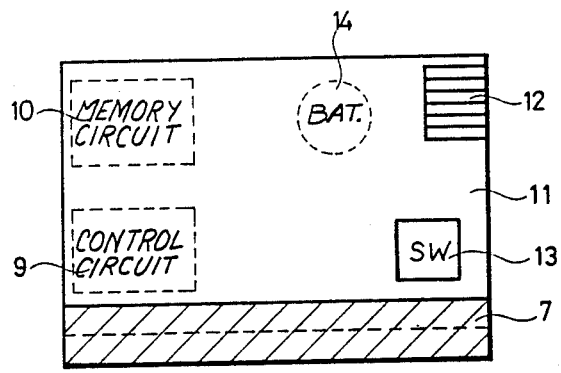
FIG. 4A is a plan view of a card type image reader according to a still further embodiment of the invention and FIG. 4B is a side view of the card type image reader of FIG. 4A.
Figure 4B:
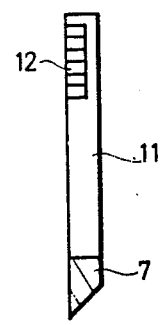
Figure 6:
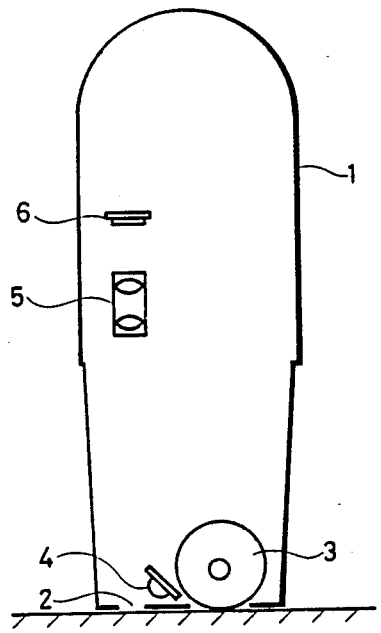
FIG. 6 is a schematic sectional view of a handy type image reader of the prior art.

Referring to FIGS. 4A and 4B, a further embodiment of the invention is illustrated. In this card type image reader, a top end of a reinforcing member 7 is formed like a wedge in cross-section as is clear from FIG. 4B. In this embodiment, the photodetector array is arranged on a slanted end surface of the reinforcing member 7 or near that surface, which enables more efficient introduction of light into a reading portion. The top end of the reinforcing member 7 may have a semicircular form in cross-section instead of the wedge form and the same effect can be also obtained in that case.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A card type image reader to be moved on a surface of an original, comprising:
   a card base,
   means for relieving bending stresses at a portion of a periphery of said card base, said relieving means including a reinforcing member provided on the portion of the periphery of said base, said card base having an area spaced away from said reinforcing member which is more easily bendable than is said portion of said periphery of the card base due to said reinforcing member being on said portion,
   a linear photodetector array formed on one end portion of said reinforcing member,
   control circuit means held in said card base, said control circuit means including clock means for generating a clock signal and reading information of said original by repeating scanning from one end to the other end of said linear photodetector array in synchronization with said clock signal, and
   memory means held in said card base, for storing information read by said control circuit means.

2. A card type image reader in accordance with claim 1, wherein
   said card base further holds an operation switch and a battery as a power supply.

3. A card type image reader in accordance with claim 1, wherein
   said card base further holds input/output terminals for an external apparatus and the information stored in said memory means is read out by the external apparatus through said input/output terminals.

4. A card type image reader in accordance with claim 1, wherein
   said card base further holds a display near said reinforcing member, for displaying said read information.

5. A card type image reader in accordance with claim 1, wherein
   the end portion of said reinforcing member where said photodetector array is provided has a wedge form in cross-section.

6. A card type image reader in accordance with claim 1, wherein
   the end portion of said reinforcing member where said photodetector array is provided has a semicircular form in cross section.

7. A card type image reader to be moved on a surface of an original, comprising:
   a card base which has a peripheral portion and an area away from said peripheral portion that is bendable;
   photodetector means;
   reading means for reading information of the original through said photodetector means, said reading means being on said card base; and
   means for relieving bending stresses at said peripheral portion of said card base so as to avoid propagation of the bending stresses to said photodetector means, said relieving means including a reinforcing member on the peripheral portion of said card base, said photodetector means being arranged on said reinforcing member.

8. A card type image reader in accordance with claim 7, wherein said photodetector means forms a linear array of photodetectors, said reading means including means for scanning across said linear array from one end of said linear array to another end of said linear array so as to read the information on the original and for storing the information read by said scanning means.

9. A card type image reader in accordance with claim 8, wherein said reading means includes clock means for generating clock signals and means for synchronizing said scanning means to repeatedly scan across said linear array from said one end to said another end of said linear array in synchronism with said clock signals to thereby read the information on the original.

* * * * *